United States Patent [19]

Goldmann et al.

[11] Patent Number: 4,713,866

[45] Date of Patent: Dec. 22, 1987

[54] APPARATUS FOR ATTACHING CABLES TO MESSENGER WIRES

[75] Inventors: Horst Goldmann, Gilching; Guenter Einsle, Munich; Rudolf Brugger, Puchheim; Josef Wacker, Hoehenrain, all of Fed. Rep. of Germany

[73] Assignee: Siemens Aktiengesellschaft, Berlin and Munich, Fed. Rep. of Germany

[21] Appl. No.: 824,097

[22] Filed: Jan. 30, 1986

[30] Foreign Application Priority Data

Feb. 13, 1985 [DE] Fed. Rep. of Germany ....... 3504959

[51] Int. Cl.⁴ .............................................. H02G 7/05
[52] U.S. Cl. .................................... 29/33 K; 29/564.7
[58] Field of Search ................. 29/564.2, 564.3, 564.4, 29/566.2, 761, 33 F, 34 D, 33 E, 33 K, 33.5; 140/113

[56] References Cited

U.S. PATENT DOCUMENTS

| Re. 27,071 | 2/1971 | Somes, Jr. ...................... 29/564.7 |
| 1,178,863 | 4/1916 | Lauber et al. ........................ 72/41 |
| 3,895,426 | 7/1975 | Papsdorf ............................ 29/564.4 |

FOREIGN PATENT DOCUMENTS

3228227 2/1984 Fed. Rep. of Germany .

*Primary Examiner*—Z. R. Bilinsky
*Attorney, Agent, or Firm*—Hill, Van Santen, Steadman & Simpson

[57] ABSTRACT

An apparatus for attaching a cable to a messenger wire utilizing clip elements characterized by a frame having an arrangement for supporting the apparatus for movement along the wire, a feed arrangement for feeding individual clips which are interconnected in a tape form to a severing shearing arrangement and then applying the clips onto the cable and wire positioned below the cable and wire, a double-belt drive arrangement for engaging the free ends of the outside of the clips and moving the free ends in contact with the messenger wire, a folding arrangement for clamping the free ends of the wire together and folding them into a folded connection.

11 Claims, 13 Drawing Figures

APPARATUS FOR ATTACHING CABLES TO MESSENGER WIRES

BACKGROUND OF THE INVENTION

The present invention is directed to an apparatus for attaching cables to a messenger wire wherein the apparatus is movable along the messenger wire and applies fastening elements or clips at spaced intervals to hold the messenger wire and cable in a combined unit. The apparatus includes a frame which has an arrangement of rollers to enable movement of the frame along the messenger wire, a storage arrangement for storing the fastening elements or clips which are preferably provided in the form of a tape of interconnected fastening elements, a feed arrangement for severing the individual elements from the tape and applying the element to the combination messenger wire and cable and a folding arrangement including at least two pairs of pressure rollers for folding the ends of the fastening elements into a folded connection or lock seam to interconnect the ends together.

An apparatus of a type which has a folding mechanism, a feed arrangement that will sever individual clips from a tape of interconnecting clips and apply them to a combination messenger wire and cable is disclosed in German OS No. 32 28 227. In this apparatus, a guide channel is formed therein by means of guide rollers and pressure rollers, the fastening element or clip is located above the messenger wire and is introduced from the apparatus onto the combination wire and cable. The ends of the clips are then moved through a folding arrangement, which is arranged under the messenger wire and cable to fold the ends together and crimp them in a folded connection.

SUMMARY OF THE INVENTION

The object of the present invention is to create an apparatus for attaching cables to messenger wires with which a reliable drive of all necessary individual apparatus elements is guaranteed and wherein a correspondingly long service life of the wearing parts, particularly the parts utilized for separating the fastening elements, is guaranteed. In addition, the object is to provide an apparatus which is simple to manipulate.

To achieve these objects, the present invention is directed to an improvement in an apparatus for securing a cable to a messenger wire by applying a fastening element at spaced intervals as the apparatus moves along the messenger wire, said apparatus having a frame with means for supporting the frame on the messenger wire for movement therealong, supply means mounted on the frame to provide fastening elements or clips in the form of a tape of interconnecting fastening elements, feed means for applying the elements to the combination messenger wire and cable including means for separating the fastening element from the end of the tape and folding means including pairs of pressure rolls for shaping the ends of the fastening elements into a folded connection. The improvements comprise the feed means being mounted in the frame beneath the cable to be fastened to the messenger wire, said means for separating being a shearing means having a plurality of chisels coacting with a mating roller fashioned as an abutment surface, said feed means having a lifting means disposed at the output of the feed means for lifting the separated fastening element onto the combination of the messenger wire and cable, a double belt drive means being positioned to engage both sides of the messenger wire in a non-positive contact as the wire moves from the feeding means to the folding means which is mounted in the frame above the messenger wire, said feed means being disengageable from the drive means, said folding means including a wedge-shaped intake throat for receiving the ends of the fastening elements as they are conducted by the drive means into the folding means and wherein the apparatus includes slinging means to enable installing the apparatus on a messenger wire. An advantage of the improved apparatus is that it can first be hung from the messenger wire in a simple way and then subsequently placed in operation by connecting the drive means. The drive means itself and the work sequence controlled by it in the individual mechanisms or means of the device however do not start until the apparatus is drawn along the messenger wire. This drawing-along can occur from the ground by means of a pulling cable. The movement of the apparatus however can also be controlled in a wireless fashion when the remotely controlled drive is provided. The drive means, however, can also be arbitrarily released as needed so that a free-wheeling of the apparatus along the messenger wire can occur. This free-wheeling is particularly important when the apparatus must be pulled back such as, for example, during a repair of a connecting location on the messenger wire. Thus, a problem spot in the connection of the cable to a messenger wire can be approached from either side and the application of the fastening elements or clips can be executed along the wire in a substantially gap free manner.

Another advantage may be seen in that the service life of the tools can be extended by multiple means of the new shearing mechanism of the invention because each of the fastening elements which are joined to one another in a band or tape-like form are divided into individual clip elements by shearing and not by cutting as heretofore was the standard.

In addition a faultless and reliable drive for all of the apparatus parts or means is secured by the double-belt drive means or arrangement. Further, a carrying roller via which additional power transmission is achieved can be coupled to this double-belt drive means.

The transfer and subsequent conveying of the clip elements now occurs by means of a drive mechanism in which the clip elements are forwarded after separation by the two belts of the double-belt drive which are moving past the feed means. The clip element is introduced into the folding mechanism with the assistance of these two belts. The forming of the ends of the clip elements to interconnect the messenger wire and cable to one another occurs as the element is introduced into the folding means. To insure that this occurs, the folding means includes a housing with a wedge-shaped intake wherein the free ends of the clip elements are already brought together in a preparatory fashion. Subsequently, the ends of the clip element which extend above the messenger wire and cable combination are subsequently held together with the free end of one folded over the other and then this folded arrangement further folded. Thus, the individual clip elements are deposited at prescribed intervals and are impressed on the combination of the messenger and cable wire. The forward movement of the apparatus will occur either from the ground by means of a traction cable or, under given conditions, can also occur by means of a motor which is then preferably provided on the frame which is remotely controlled.

DESCRIPTION OF THE PREFERRED EMBODIMENTS

Figure 1:
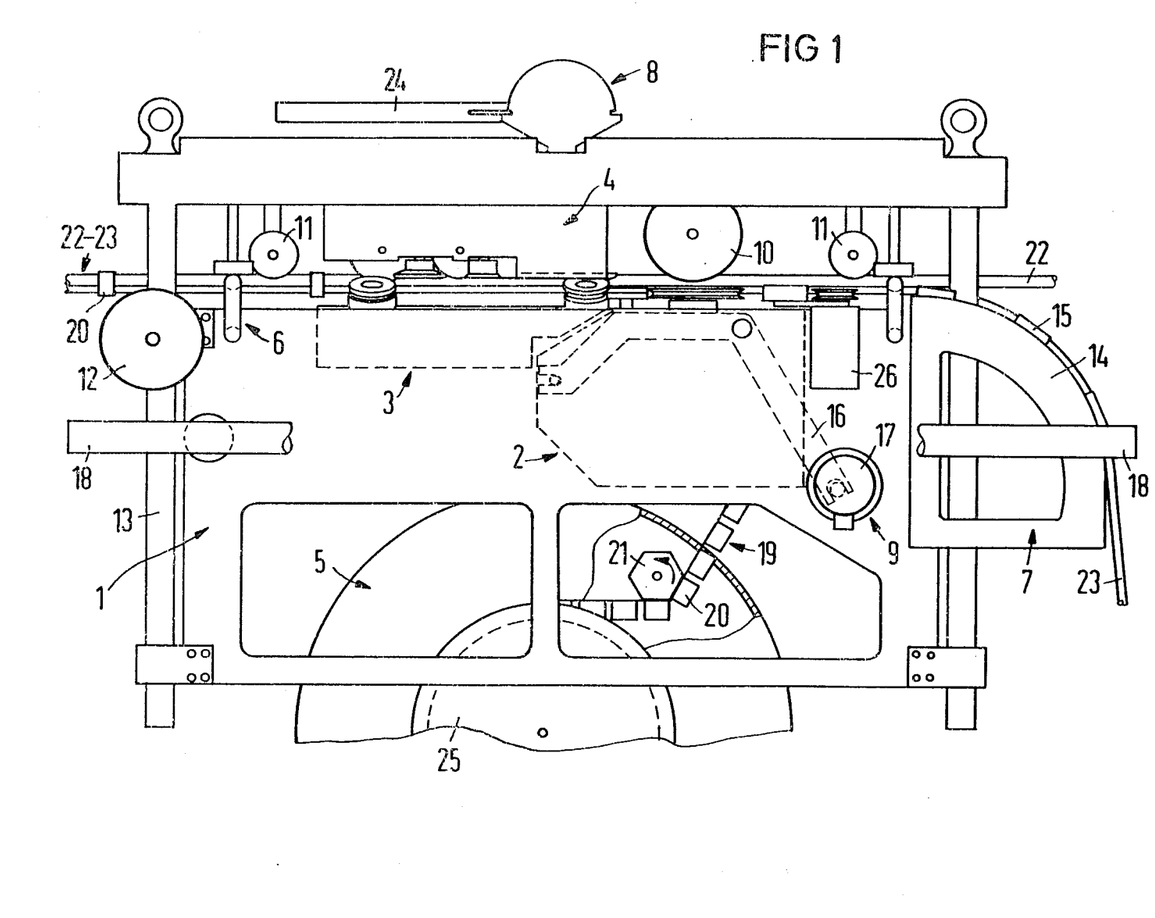
FIG. 1 is a side view of the apparatus of the present invention.

The principles of the present invention are particularly useful when incorporated in apparatus generally indicated at 1 in FIG. 1 for securing a cable 23 to a messenger wire 22 by applying fastening elements or clips 20 at spaced intervals as the apparatus 1 moves along the messenger wire 22.

As illustrated in FIG. 1, the apparatus 1 has a frame 13 in which the various functional units such as a cable feed means 7, a storage bin or reel 5 for a tape 19 of fastening elements 20, feeder means 2, double-belt drive means 3, folding means 4, auxiliary sling means 6 and a release mechanism 8 are situated. The guidance of the messenger wire 22 and of the cable 23 which is to be clipped thereto as well as the partial guidance of the tape 19 of fastening elements 20 from the storage reel or bin into the feed means 2 can also be seen in this Figure. It proceeds that the messenger wire 22 as well as the cable 23 are conducted above the feed means 2 and above the double-belt drive means 3 whereby the auxiliary sling means 6 for applying the overall apparatus 1 to the messenger wire 22 are respectively situated at the beginning and the end of the frame 13 of the apparatus 1. The apparatus is aligned with these auxiliary sling means 6 such that it hangs on the messenger wire 22 with its carrier or transport rollers 11 and thus can be moved forward in a hanging fashion. In this case, an auxiliary drive roller 10, which has a relatively large diameter, is provided in addition to the double-belt drive means 3 and is mechanically coupled thereto via a gearing so that additional power transmission is achieved.

The fastening elements 20 are preferably provided as a tape 19 of interconnected elements which are supplied to the feed means 2 from the bin or reel 5 and are divided in the feed means into individual clip elements 20, lifted onto the combined wire 22 and cable 23, and finally are forwarded by the double-belt drive means 3. Details regarding this shall be set forth hereinafter in greater detail.

A drive connection of the feed means 2 to the drive means 3 can be released by a connecting mechanism 9 with the assistance of a corresponding lever system 16 and potentially with the assistance of a control motor 17 so that the apparatus 1 can be pulled along the messanger wire 22 in a "free-wheeling fashion".

While pulling the apparatus along the wire 22, the roller 10 rotates in addition to the belt driven roller 29. Both rollers are connected with a gear (not shown). The gear works or drives the feed arrangement 2. If it is desirable to pull the apparatus without attaching clip element 20 to the wire 22, the gear is disconnected from the feed arrangement 2 by the lever system 16. The motive power for moving the lever system 16 is provided by the remote controlled motor 17. The feed of the tape 19 of fastening elements 20, which tape is still wound tape-like on a drum core or spool 25, is uniformly drawn from the core with each of the fastening elements having the profile of the clip element 20 being withdrawn by a multi-edge planar disk 21 which is illustrated as having six sides and whose movement is synchronized to the playout of the feed means 2. The spacing between the edges of the disk 21 corresponds to the exact length of the clip element 20 which is being utilized.

The cable 23, which is to be secured to the messenger wire 22, is supplied via a cable feed means 7. This cable feed means 7 contains a plurality of cable guides 15, which are situated on a curved frame 14 and provide a groove in which the cable 23 is guided. These cable guides 15 are angularly fashioned so that they simultaneously serve as dirt strippers for the cable 23. The curvature of the frame 14 is selected so that the cable is not bent more greatly than allowed during the feed so that faultless protection against buckling or respective overbending is established. It is also seen from this Figure. that after the messenger 22 and the cable 23 have been brought together, the common combined messenger wire/cable 22, 23 traverses the double-belt drive means 3, which provides a drive for the different mechanism, and the folding means 4 for the clip element 22 situated thereabove and departs the apparatus at a discharge end with the ends of clip elements 20 pinched and connected together. A guide roller 12 at the discharge end assures continual motion particularly given a reverse running of the apparatus. With the assistance of a release mechanism 8, which is mechanically actuated by a lever 24, the apparatus can be lowered onto the messenger wire 22 in a completely functional prepared fashion after being slung on the messenger wire 22 with the assistance of the auxiliary slinging means 6 whereby the non-positive contact between the messenger wire 22 and the drive mechanism is guaranteed at the same time. Finally, a gearing 26, which is known per se, is also provided and synchronizes the two belt drives and the roller 10. Finally, the frame 13 has carrying apparatus in the form of parallel pipes 18 which extend on each side and are used for transporting the apparatus to the site and for lifting the apparatus during mounting it onto the messenger wire.

Figure 2:
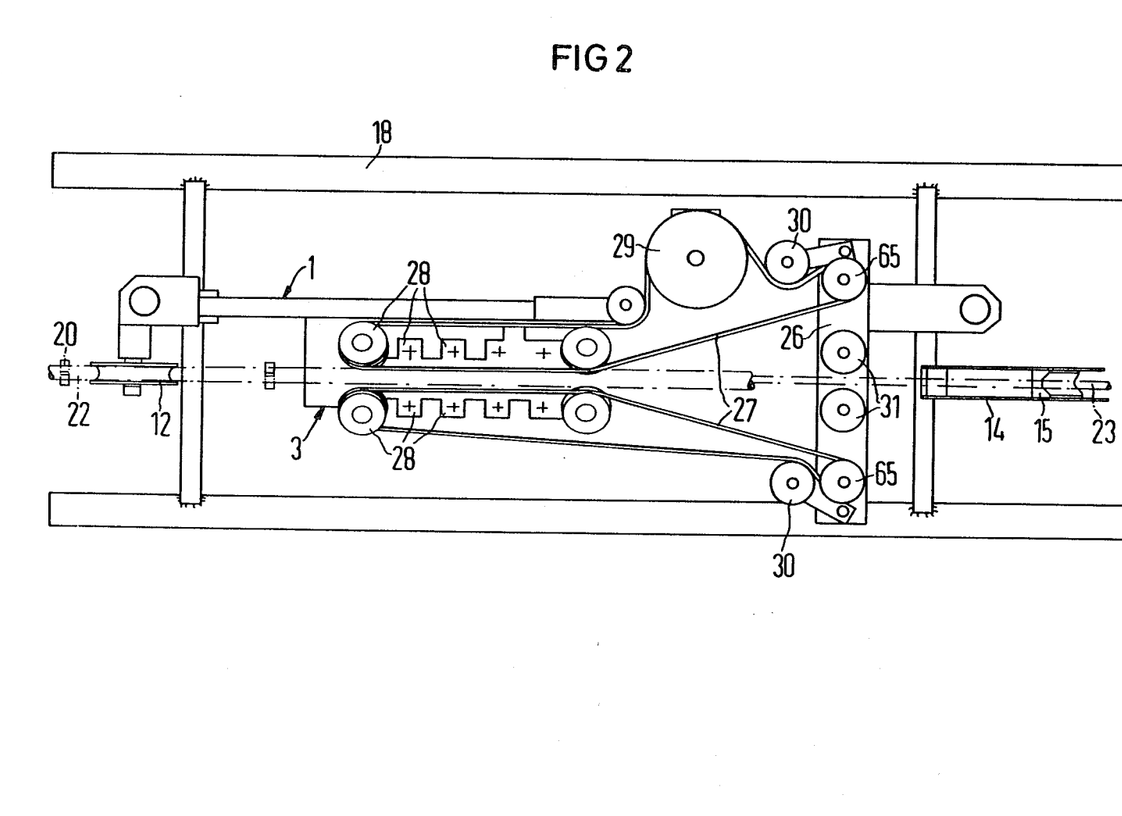
FIG. 2 is a top plan view with portions removed for purposes of illustration of the apparatus of the present invention.

The principles of the double-belt drive means 3 are set forth in greater detail in FIG. 2 wherein the parts situated above the messenger wire 22 have been removed for purposes of illustration. This double-belt drive means 3 is essentially composed of two individual belts 27 which are guided along both sides of the messenger wire 22 in grooves 49 (FIG. 6) of a plurality of guide rollers 28 which are situated to follow one another along the length of the path of the belt and provide a non-positive contacting along the messenger wire when the drive means is in the engaged condition. With an advance of the apparatus along the messenger wire 22, the belts 27 are entrained as a consequence of the friction between the belt and the messenger wire 22 so that the require power transmission occurs by movement of the belt around the roller 29 which is connected to the a feeder means and via the roller 65 into the gearing 26 respectively to the following mechanisms. Separate tension rollers 30 are provided in the paths of the belts 27 to provide tension and these tension rollers 30, respectively, effect correct tension by means of being biased by spring means (not illustrated). The messenger wire 22 and the cable 23, which is to be secured thereto, are partially illustrated in chain lines in this Figure. In the case of the latter, the feeder frame 14 with the groove-shaped cable guides 15 secured therein is visible. Rough guidance rollers 31 are situated to stabilize the supply cable 23 and to align it with the messenger wire 22 as the two pass therebetween. Finally, the guide roller 12 which is at the output or discharge end of the apparatus is also shown and the finished combination of the messenger wire/cable 22, 23 emerges thereover.

Figures 3A, 3B:
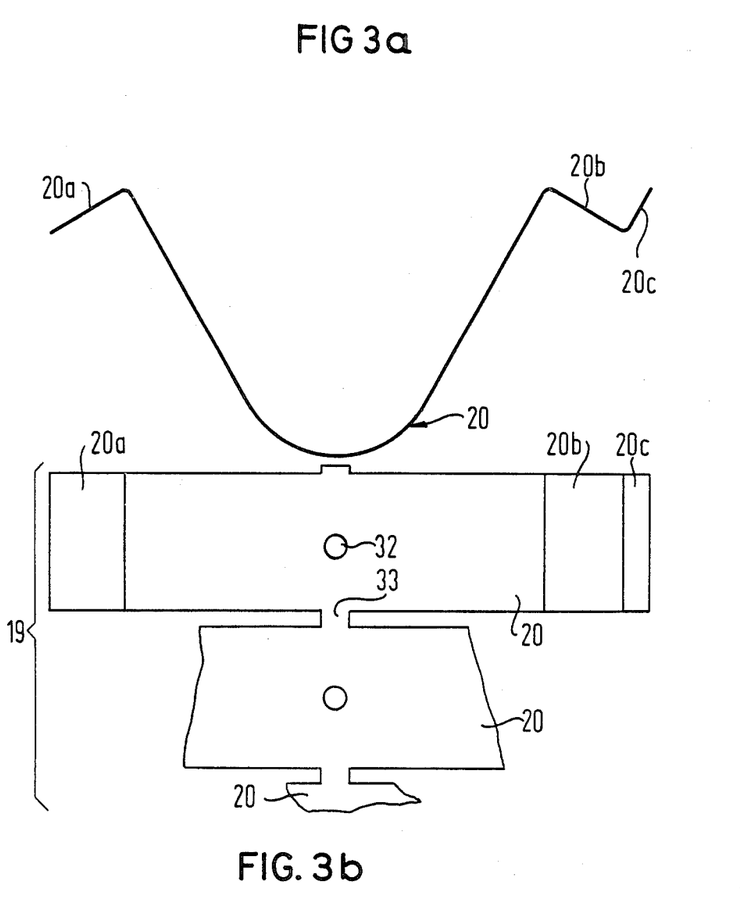
FIG. 3a is an end view of a clip element preferably used with the apparatus of the present invention.
FIG. 3b is a partial plan view of a tape of the clip elements utilized in the present invention.

As illustrated in FIG. 3a, the individual clip element 20 has a V-shaped configuration. One leg of the element 20 has a bent end 20a which extends outwardly at right angles thereto while the other leg has a bent end 20b which extends outwardly at right angles to the leg and terminates in another bent portion 20c extending upwardly at right angles to the portion 20b and parallel to the leg. The clip elements 20 which are united in a tape 19 of interconnected elements have already been prebent to the desired configuration illustrated in FIG. 3a. During assembly of the clip element 20 onto the combined messenger wire and cable, the relative movement is such that the cable 23 with the messenger wire 22 thereabove moves into the V-shaped portion and the ends of the clip are then wrapped and folded around to form the connection as described hereinafter.

As best illustrated in FIG. 3b, the individual elements 20 are interconnected to form the tape 19 with the interconnection being a narrow web 33. The separation of the band-shaped fastening elements or clips 20 from the tape 19 occurs in the feeding means as set forth hereinafter. Holes 32 are provided in each of the clip elements 20 to receive synchronizing pins 36 which aid in synchronizing the transportation of the individual elements into the feed means as well as during the assembly onto the combined messenger wire 22 and cable 23.

Figure 4:
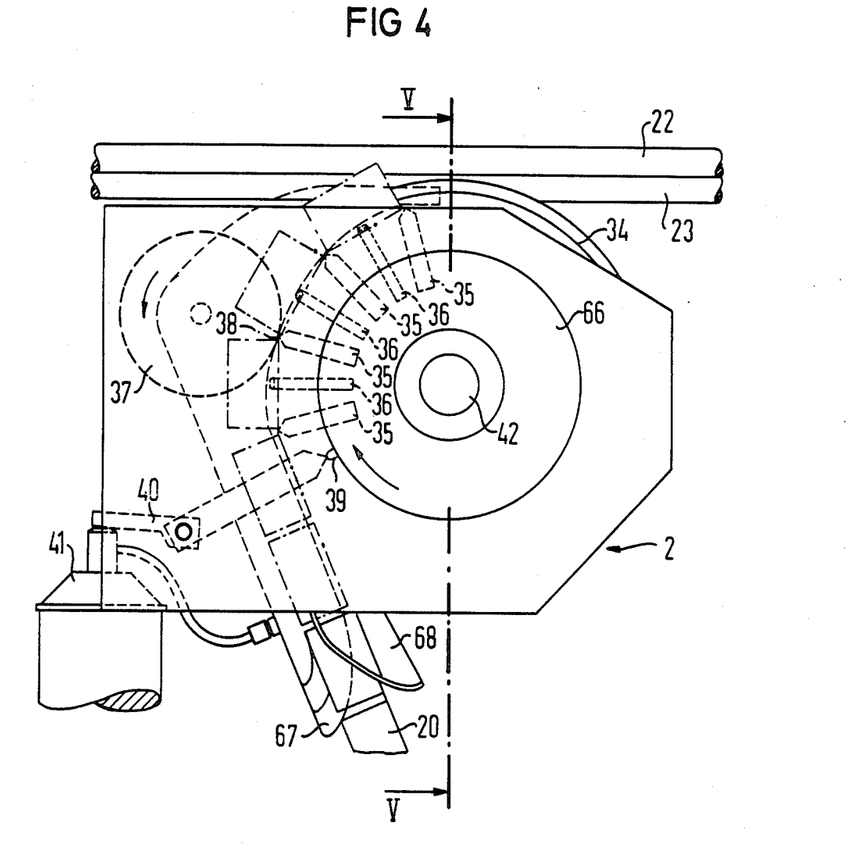
FIG. 4 is an enlarged side view of the feeding means for the fastening elements in accordance with the present invention.

The feed means 2, as best illustrated in FIG. 4, is essentially composed of a disk-shaped carrier member 66 on whose outer circumference the parting tools in the form of chisels 35 are situated in a uniform distribution. As illustrated, approximately twelve chisels 35 are provided and extend spokelike from the center of an axle 42 of the carrier member 66. In contrast to prior methods, the chisels 35 serve the purpose of parting by shearing and not by cutting. This means that the service life of the parting tool is significantly increased. For shearing an article off, however, an abutment is necessary and this abutment is formed therein by a disk 37 of hard material, for example, steel, which rotates step-by-step. The shearing of the fastening means of the clip elements 20 from the tape 19 occurs in the region of the web 33 and occurs precisely at the point 38, when the corresponding chisel 35 resides perpendicular to the circumferential surface of the disk 37 which functions as an abutment. Here, the spacing between the chisel tips and the surface of the abutment is selected such that a faultless shearing can occur.

The band 19 of clip elements 20 is supplied from the reel 25 through a matched formed gap to this particular point 38. This formed gap is established by form member 67 adapted to the inner shape of the clip element 20 and an outer formed plate or member 68. A formed gap thus occurs between the two members and this formed gap precisely corresponds to the clip element 20 and guide the clips until it is transferred to the double-belt drive means 3. Synchronizing pins 36 see to the correct positioning of the tape 19 during the time of separation and the synchronizing pins 36 are located between the chisels 35 on the circumference of the disk-shaped carrying member 66 and are preferably arranged as twelve pins between the twelve chisels 35 for the rotating carrier member 66. The chisels 35 also aid in the forward feed of the clip elements 20 and these chisels comprise a V-shaped formed-out portion towards the outside which engages behind the clip element 20 and conveys these forward by respectively one step given continual rotation. Further, a lubricating device 41 is controlled by a nipple or trip 39 on the disk 66. Thus, this nipple 39 will exert a pressure through a linkage 40 against a lubricating reservoir 41 during each revolution and thereby delivers a corresponding portion of lubricant to the required locations, for example, to the gap between the members 67 and 68.

Figure 5:
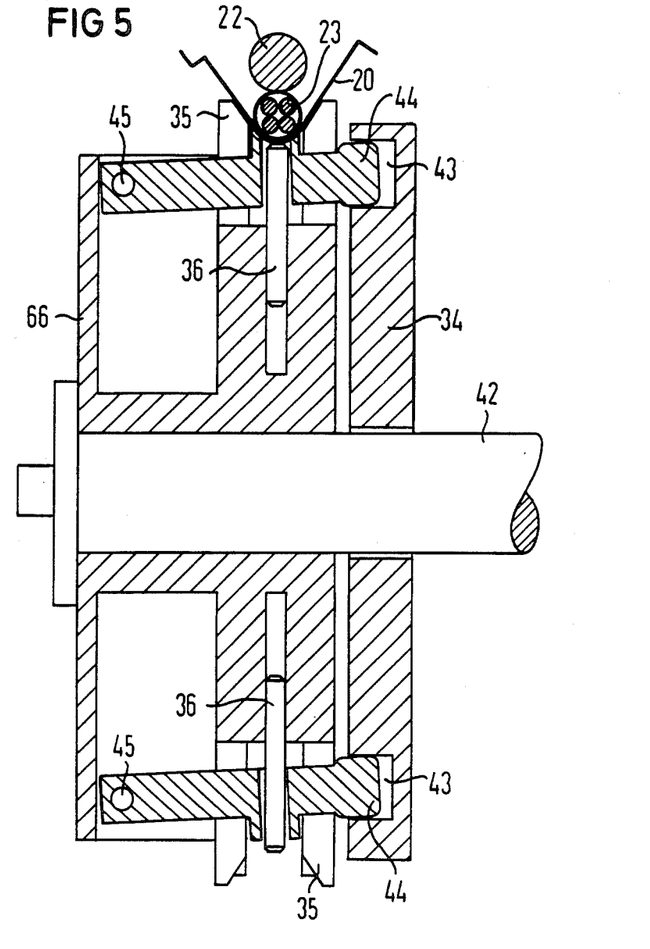
FIG. 5 is a cross-sectional view taken along the lines V—V of FIG. 4.

The transfer of the separated clip element 20 to the double-belt drive means, which is not illustrated in FIG. 4, and which forwards the clip into the folding means, occurs in the upper region of the feed means 2 adjacent to the path of the cable 23 and the messenger wire 22. This transfer is best illustrated in FIG. 5 wherein the lifting means or mechanism is seated on the rotary carrying member or drum 66 for lifting the clip 20 after it has been separated from the interconnected tape. The clip element 20 is guided by the synchronizing pins 36 up to the point of lifting. The lifting mechanism includes a plurality of lifting levers 44 which are mounted for pivotal movement by a pivot pin 45 on the drum or carrier 66. Each of the levers 44 has a bore in which the synchronizing pin 36 extends. As illustrated, the mounting by the pin 45 positions each of the levers 44 to extend substantially parallel to the axle 42 of the drum and each of the levers 44 at a free end opposite the pin 45 has an enlarged end which is received in a groove 43 of a fixed disk or member 35. The groove 43 is constructed relative to the axle 42 so that for a majority of the time, the levers 44 are in the retracted position 143 with the lever being pivoted towards the axle 42 so that the synchronizing pin 36 extends past the lever. However, at the upper point where the lifting occurs and as illustrated by the position 144, the groove 43 is shaped to pivot the pin radially outwardly to lift the clip element against the cable 23 and out of engagement with the pin 36. Thus, the groove 43 acts as a cam surface with the enlarged end portions of the lever 44 being followers.

Figure 6:
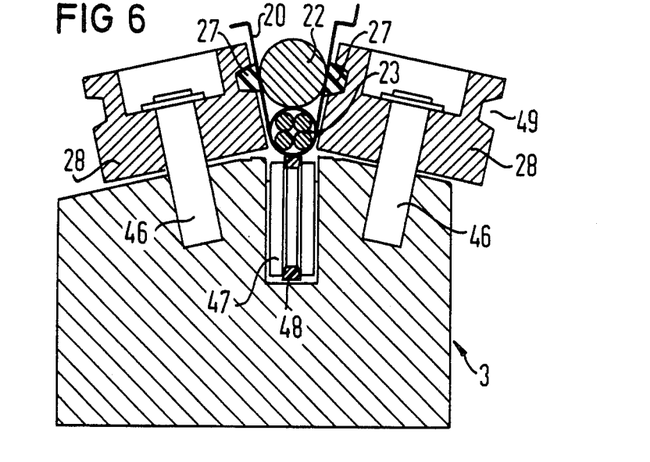
FIG. 6 is a cross-sectional view of a portion of the double-belt drive arrangement in accordance with the present invention.

In this lifted position, the clip is engaged with the cable 23 and is placed in the converging portions of the paths of the two belts 27 which portion is illustrated in FIG. 2. As the clip moves with the cable 23, it is engaged on its outer sides by the belts 27 and moved into engagement with the messenger wire 23 as illustrated in FIG. 6. In addition, the lower portion of the clip is engaged by a V-belt 48 which is carried between a plurality of rollers 47. Thus, the position of the clip 20 relative to the cable 23 is unequivocally fixed and the combined messenger wire/cable 22, 23 is also non-positively guided laterally between the belts 27 of the double-belt drive means 3. The drive for the individual mechanisms occurs by means of the friction between the belts 27 and the messenger wire. It may be further seen that the clip element 20 accepted by the two belts 27 is already introduced in the proper attitude for the application to the combined messenger wire/cable. In this region, the belts 27 are guided in grooves 49 of the rollers 28 whose shafts 46 are inclined in accordance with the diameter ratio of the messenger wire 22 and the cable 23 in order to achieve an optimum adaptation and thus power transmission as well. The double-belt drive means 3 is preferably interchangeable for this reason so that the units can be adapted to diameter ratios that are being utilized.

Figure 7:
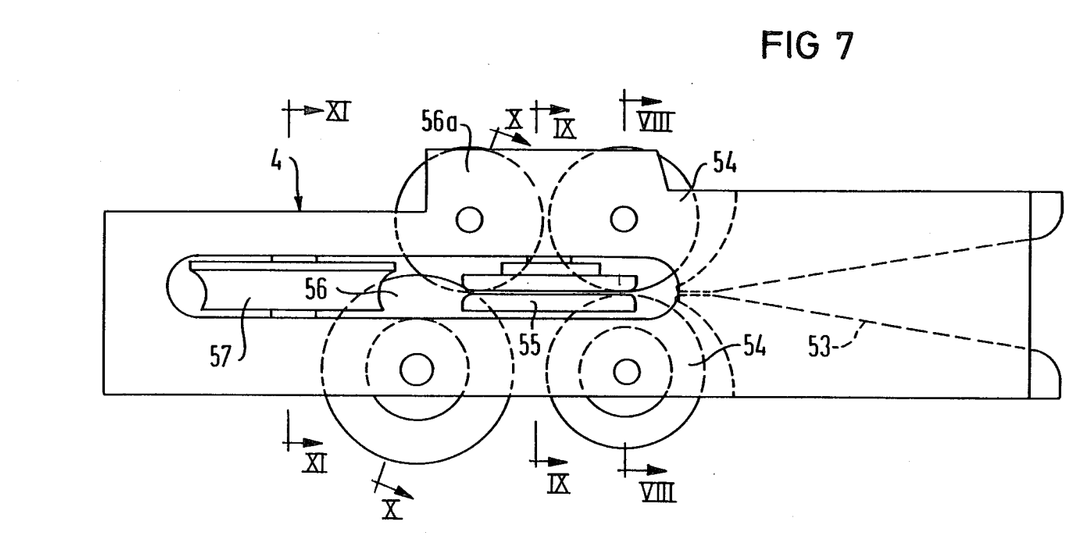
FIG. 7 is a top plan view of the folding means of the present invention.

The folding means 4 interacts with the drive means 3 and has a housing portion with a tapering or wedge-like throat 53 which engages the free ends such as 20a and 20b of the clip 20 and urge them together as the clip moves into the folding means 4. As the ends 20a and 20b are moved together, they are then engaged by a first pair of rollers 54, which are pressure rollers that press them tightly together. Then, subsequently, a second folding step occurs when the element 20 is received in a circumferential groove 60 of the folding roller 55 (best seen in FIG. 9) so that the free end 20c, which was still projecting at right angles to the portion 20b as the elements pass through the pair of rollers 56, is folded back onto the portion 20a. After passing through the folding roller 55, the folded arrangement then passes through a pair of rollers 56 and 56a which are bending rollers that bend the folded portion over so that a final folding roller such as 57 can press the bent ends together to form the lock seam-type connection or folded connection. After passing through this folding means 4, the clip-on process has concluded and thus the sequence will begin anew for the next clip being applied at the desired space along the axis of the messenger wire 22.

Figure 8:
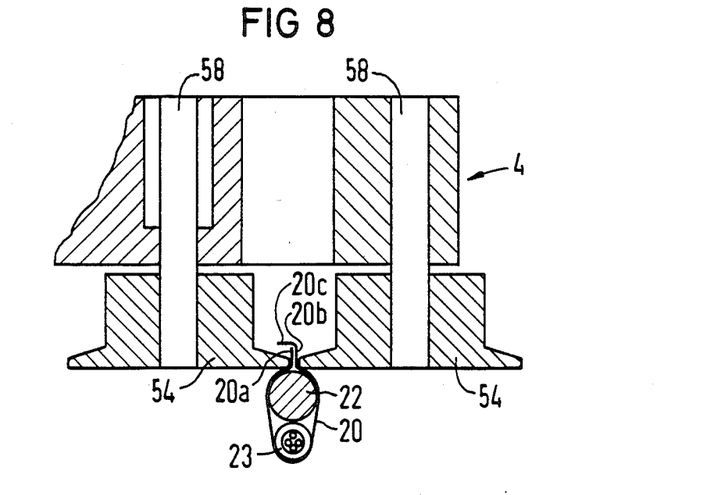
FIG. 8 is a partial cross-sectional view taken along lines VIII—VIII of FIG. 7.

The operation of the first pair of pressure rollers 54 of the folding means 4 is best illustrated in FIG. 8. The first pair of rollers 54 are mounted by shafts 58 to rotate around the axis extending substantially perpendicular to the axis of the messenger wire 22. This pair of rollers 54 hold the portions 20a and 20b in tight engagement, however, the portion 20c still is extending substantially at right angles to the portion 20b and 20a. When the portions 20a and 20b are pressed together, the impression and clamping of the clip element 20 on the combined messenger wire/cable simultaneously occurs so that considerable fluctuations in the diameter of the messenger wire and/or in the cable 23 are compensated by the clamping of the clip element 20 and by the tighter folding effected by the assistance of the pressure rolls 54 and of the V-belt 48 of FIG. 6.

Figure 9:
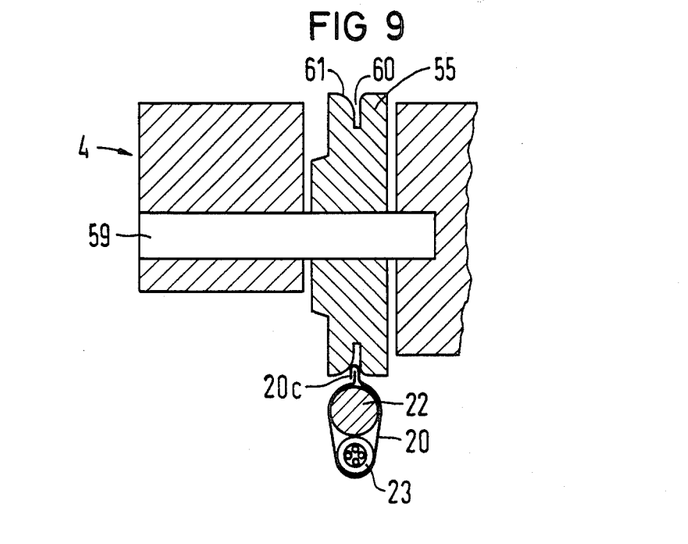
FIG. 9 is a partial cross-sectional view taken along lines IX—IX of FIG. 7.

As the clip moves from the pair of rollers 54, it then enters the circumferential folding groove 60 of the roller 55 which rotates on an axle 59 that extends perpendicular to the axle 58 of the rollers 54. The groove 60 on one side has a rounded edge 61 which will engage the free end 20c and fold it down onto the held-together ends 20a and 20b to form a lock seam or folded connection. It should be noted that this rounded edge is always positions on the side to which the free edge 20c extends.

Figure 10:
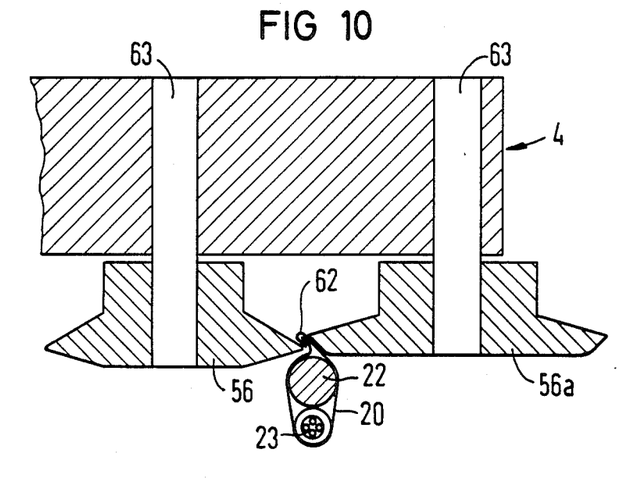
FIG. 10 is a partial cross-sectional view taken along lines X—X of FIG. 7.
Figure 11:
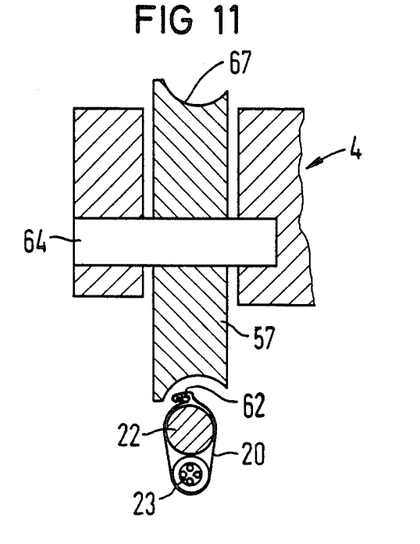
FIG. 11 is a partial cross-sectional view taken along lines XI—XI of FIG. 7.

Subsequent to the folding of the edge 20c against the other edge portion 20a, the clip will then be passed through a pair of bending rolls 56 and 56a whose shafts 63 are situated to extend perpendicular to the shaft 59 of the folding roller 55. The edges of the bending rolls 56 and 56a are beveled in opposite directions so that an oblique processing gap will occur to move the folded edges into the configuration of a fold 62 (FIG. 10). In addition, the two shafts 63 are offset somewhat relative to one another so that the bending roll 56a whose edge is broader at the top than at the bottom contacts the fold 62 first and bends it laterally. During the next course, the fold 62 is further deformed and pressed together in the oblique gap between the two bending rolls 56 and 56a. After the bending of the fold 62 to the oblique position, the fold is then pressed flat by a folding roller 57 which rotates on an axle 64 which is perpendicular to the axle 63 and parallel to the axle 59. The folding roller 57 has a segmented groove 67 and the height of this segmented groove is adapted such that a combined messenger wire/cable with the clip element 20 will have the fold 62a completely pressed down. The clipped-on operation has thus been concluded and the combined messenger wire cable cable departs the device in the interclipped condition via the last guide roller 12.

Figure 12:
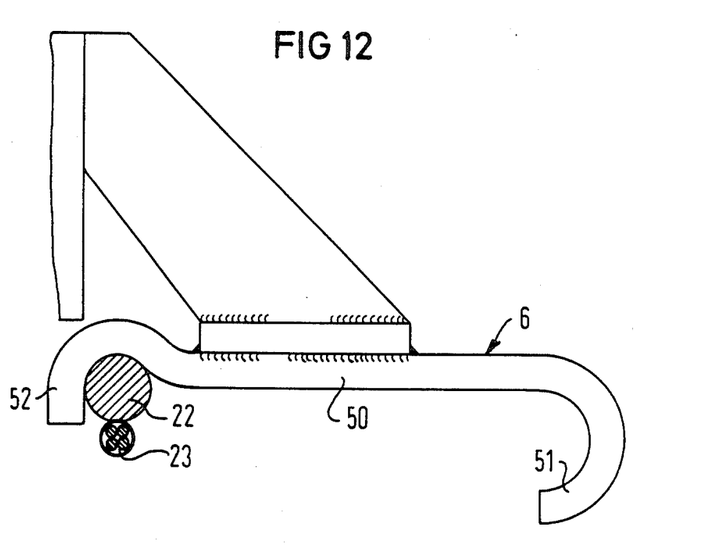
FIG. 12 is a partial enlarged end view of one of the auxiliary slinging devices of the present invention.

In order to suspend the apparatus 1 from a messenger wire 22 in a simple fashion before the beginning of the clipping operation, the auxiliary slinging mechanism or means 6 is provided. This auxiliary sligning mechanism 6 includes two elements, one situated at the front end of the apparatus and the other at the rear or the discharge end of the apparatus. Each of these mechanisms as illustrated in FIG. 12 comprise a stirrup or shackle 50 which is firmly secured to the frame of the apparatus 1 and has bent hook at both ends 51 and 52. The end 51 is thereby preferably fashioned as a catch hook whereas the hook-shape of the second end 52 approximately corresponds to the form of the messenger wire 22 and is such to accept the diameter of the messenger wire 22. The position of the hook 52 also coincides with the position of the messenger wire with respect to the roller 11 except for the height. The apparatus can now be randomly hooked onto the messenger line via its end 51 in an uncomplicated fashion and is then pushed or shifted to the second hook end 52 via the straight part of the stirrup or member 50. Once the apparatus is positioned in the hook 52, it can then be operationally activated by actuating the release mechanism 8 which positions the various guide rollers such as 11 to engage the messenger wire 22 and lift the apparatus off of the hook 52.

Although various minor modifications may be suggested by those versed in the art, it should be understood that we wish to embody within the scope of the patent granted hereon, all such modifications as reasonably and properly come within the scope of our contribution to the art.

We claim:

1. In an apparatus for securing a cable to a messenger wire by applying fastening elements at spaced intervals as the apparatus moves along the messenger wire, said apparatus having a frame with means for supporting the frame on the messenger wire for movement thereon, supply means mounted in the frame to provide fastening elements in a form of a tape of interconnected fastening elements, feed means for applying the elements to a combination of the messenger wire and cable including means for separating the fastening element from the end of the tape and folding means including pairs of pressure rollers for shaping the ends of the fastening elements into a folded connection, the improvements comprising the feed means being mounted in the frame beneath the cable and messenger wire, the means for separating including shearing means having a plurality of chisels and a mating roller having an abutment surface coacting with the chisels, the feed means including a lifting means for lifting served fastening elements into a position engaging the combination of the cable and messenger wire, said apparatus including drive means for actuating the feed means, said drive means having two belts which are positioned to engage the messenger wire on opposite sides as the apparatus moves along the wire, said feed means being releasably connected to the drive means to enable moving the apparatus without actuating the feed means, said two belts of the drive means engaging the free ends of the fastening element to move them toward each other and into engagement with opposite sides of the cable and messenger wire as the element moves from the feed means towards the folding means, said folding means being positioned above the messenger wire and having a wedge-shaped throat for receiving and moving the free ends of the elements close together to be engaged by the pairs of pressure rollers to form the folded connection.

2. In an apparatus according to claim 1, wherein the drive means includes a drive roller and a synchronous transmission for synchronizng the movement of the two belts with the drive roller.

3. In an apparatus according to claim 1, wherein the folding means comprises two cylindrical pressure rollers lying opposite one another in the folding region for pressing the free ends of the fastening element into contact with each other, a folding roller having a circumferential groove having one side rounded off, said folding roller being mounted on a shaft for rotation on an axis perpendicular to the axis of rotation of the pressure rollers for folding a free end portion of one end of the fastening element around the outer end of the pressed-together portions of the element to form a folded connection, said folding means including a pair of bending rollers mounted for rotation on an axis extending parallel to the axis of the first pair of rollers and perpendicular to the axis of rotation of the folding roller, said bending rollers bending the folded connection obliquely to the wire and being followed by a final folding roller mounted for rotation on an axis parallel to the first folding roller and perpendicular to the axis of the bending roller to fold the folded connection down onto the fastening element to complete the folding operation.

4. In an apparatus according to claim 3, wherein the bending rollers have bending surfaces formed by bevels extending in opposite directions and said bending rollers being mounted offset relative to one another along the path of the wire so that one bending roller engages the folded portion prior to the other bending roller.

5. In an apparatus according to claim 1, wherein the chisels of the shearing means are mounted on a rotating drum to extend radially outwardly therefrom with the circumferential distance between two adjacent chisels being the same as the length of the fastening element, said drum mounting synchronizing pins for positioning the tape of fastening elements on the drum with respect to a shearing point.

6. In an apparatus according to claim 5, wherein the lifting means includes a plurality of levers with one lever for each of the synchronizing pins, said levers having one end pivotally mounted to the drum with the other end being received in a cam groove, each of the levers having a bore through which the synchronizing pins extend and said cam groove having a shape to hold the levers in a retracted position with the pin extending through the bore and at the point of lifting to pivot the lever outwardly to an extended position to lift the element off of the synchronizing pin and onto the cable.

7. In an apparatus according to claim 1, wherein the supply means includes a supply reel for receiving the tape of interconnected elements.

8. In an apparatus according to claim 7, wherein the feed means includes a lubricating means for applying a lubricant to the tape of elements as they proceed to the shearing means.

9. In an apparatus according to claim 1, which includes a cable feed means for guiding the cable as it is moved into engagement with the messenger wire, said cable feed means including means for stripping dirt from the exterior of said cable.

10. In an apparatus according to claim 1, which includes auxiliary slinging means to enable installing the apparatus on a messenger wire, said auxiliary slinging means comprises two elements secured to the frame of the apparatus, each of said elements having a hook at each end with the first hook of each element being an enlarged hook for engaging the messenger wire when mounting the apparatus and the second hook of each element having a size approximately corresponding to the diameter of the messenger wire and being positioned in alignment with the means for supporting the frame on the messenger wire for movement therewith so that the apparatus can be installed on the messenger wire by utilizing the first hooks, and then after moving the apparatus to position the wire on the second hooks to allow the means for supporting the frame on the messenger wire for movement to engage the wire.

11. In an apparatus according to claim 1, which includes a third belt engaging the lower surface of the cable and being positioned between the two belts of the drives means, said third belt holding the clip element against the cable as the free ends are held by the two belts against the opposite sides.

* * * * *